UNITED STATES PATENT OFFICE.

ROBERT R. GRAF, OF BALTIMORE, MARYLAND, ASSIGNOR OF ONE-HALF TO FERDINAND W. REIS, OF SAME PLACE.

REFRIGERATING COMPOSITION.

SPECIFICATION forming part of Letters Patent No. 450,862, dated April 21, 1891.

Application filed November 28, 1890. Serial No. 372,892. (No specimens.)

*To all whom it may concern:*

Be it known that I, ROBERT R. GRAF, a citizen of the United States, and a resident of Baltimore, in the State of Maryland, have invented certain new and useful Improvements in Refrigerating Composition; and I do hereby declare that the following is a full, clear, and exact description of the invention, which will enable others skilled in the art to which it appertains to make and use the same.

This invention relates to compounds or compositions for artificially reducing the temperature of air, water, or other fluids to and below the freezing-point, and thereby adapting the air or fluid thus treated for refrigerating purposes, in conjunction with certain apparatus adapted for such purpose.

My improved refrigerating composition is made by mixing the following ingredients in about the proportions stated, by weight, viz: monocarbonate of soda, three parts; muriate of ammonia, three parts; nitrate of ammonia, three parts; nitrate of potash, five parts; potash alum, five parts; chloride of sodium, five parts, and glycerine a suitable quantity. These several ingredients are thoroughly triturated with a pestle in a mortar, or by suitable machinery, and molded into cakes of suitable size and shape; or, if preferred, the mass may be left in a plastic state, the condition of the composition depending upon the quantity of glycerine.

To use this composition it is placed in a suitable water-tight receptacle, constructed, preferably, in the top part of the refrigerator, and mixed with water until dissolved. A blast of air is then forced through the solution (by a fan-blower or other suitable means) and into the refrigerating box or chamber proper; or, if desired, instead of forcing air through the solution, the solution itself may be forced through pipes, either arranged in one or more coils or lining the walls of the refrigerating-chamber, so as to give as large a pipe area as possible.

Having thus described my invention, I claim and desire to secure by Letters Patent of the United States—

The herein-described refrigerating composition, consisting of a mixture of monocarbonate of soda, muriate of ammonia, nitrate of ammonia, nitrate of potash, potash alum, chloride of sodium, and glycerine, in the proportions substantially as set forth.

In testimony that I claim the foregoing as my own I have hereunto affixed my signature in presence of two witnesses.

ROBERT R. GRAF.

Witnesses:
AUGUST PETERSON,
BENNETT L. JONES.